(12) United States Patent
Katz

(10) Patent No.: US 8,723,979 B2
(45) Date of Patent: May 13, 2014

(54) PORTABLE ELECTRONIC EQUIPMENT WITH AUTOMATIC CONTROL TO KEEP DISPLAY TURNED ON AND METHOD

(75) Inventor: Darius Katz, Malmo (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 0 days.

(21) Appl. No.: 13/406,805

(22) Filed: Feb. 28, 2012

(65) Prior Publication Data

US 2012/0157169 A1  Jun. 21, 2012

Related U.S. Application Data

(63) Continuation of application No. 11/861,462, filed on Sep. 26, 2007, now Pat. No. 8,159,551.

(51) Int. Cl.
*H04N 5/228* (2006.01)
*H04N 5/222* (2006.01)

(52) U.S. Cl.
USPC .................. 348/222.1; 348/333.11

(58) Field of Classification Search
USPC .......................... 348/222.1, 333.11
See application file for complete search history.

(56) References Cited

U.S. PATENT DOCUMENTS

| 6,111,517 | A | 8/2000 | Atick et al. |
| 2002/0071036 | A1 | 6/2002 | Gonzales et al. |
| 2003/0146897 | A1 | 8/2003 | Hunter |
| 2004/0175020 | A1 | 9/2004 | Bradski et al. |
| 2005/0198661 | A1* | 9/2005 | Collins et al. ................... 725/19 |
| 2005/0221791 | A1 | 10/2005 | Angelhag |
| 2006/0139463 | A1* | 6/2006 | Heinonen ..................... 348/239 |
| 2006/0140452 | A1 | 6/2006 | Raynor et al. |
| 2007/0009139 | A1 | 1/2007 | Landschaft et al. |
| 2008/0118152 | A1* | 5/2008 | Thorn et al. .................. 382/190 |

FOREIGN PATENT DOCUMENTS

| JP | 2006 211421 A | 8/2006 |
| WO | 2005/048091 A | 5/2005 |
| WO | 2007/029710 A | 3/2007 |

OTHER PUBLICATIONS

International Search Report for corresponding Application No. PCT/IB2008/000667 mailed Jul. 7, 2008.
Written Opinion for corresponding Application No. PCT/IB2008/000667 mailed Jul. 7, 2008.
International Preliminary Report on Patentability for corresponding Application No. PCT/IB2008/000667 mailed Mar. 4, 2010.
Co-pending U.S. Appl. No. 11/861,462, filed Sep. 26, 2007, (allowed claim provided).
European Search Report corresponding to European Application No. 13165555.7 mailed Jul. 2, 2013.

* cited by examiner

*Primary Examiner* — James Hannett
(74) *Attorney, Agent, or Firm* — Renner, Otto, Boisselle & Sklar, LLP

(57) ABSTRACT

Apparatus and method provide a hold on function in a mobile phone or other portable electronic equipment keeps the display thereof turned on in spite of a screensaver or other power saving feature while a user is reading or watching the display and allows activating of power saving facilities of the mobile phone or equipment only when a user no longer is reading or watching the display. Also, a computer program product stored in a storage medium, includes a storage medium, a computer program including face recognition software to recognize whether an input image represents that of a human face, and a control program to control operation of portable electronic equipment depending on whether or not an input image represents a human face.

16 Claims, 3 Drawing Sheets

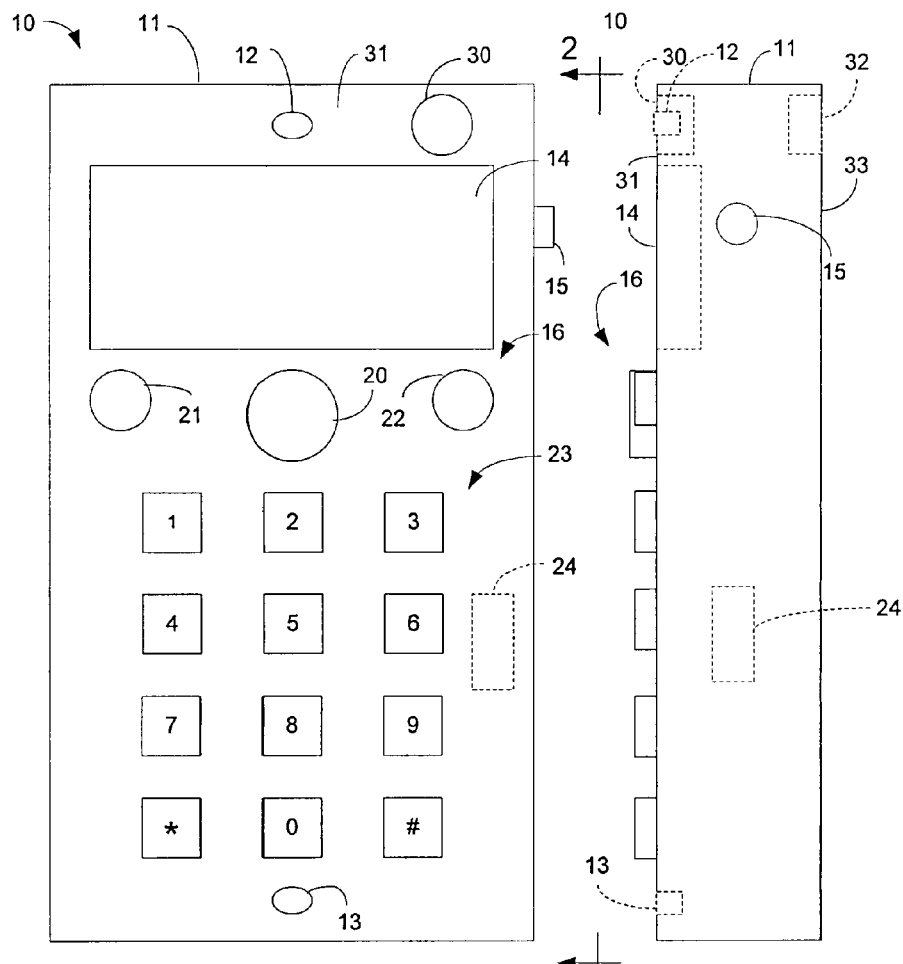
FIG. 1
FIG. 2
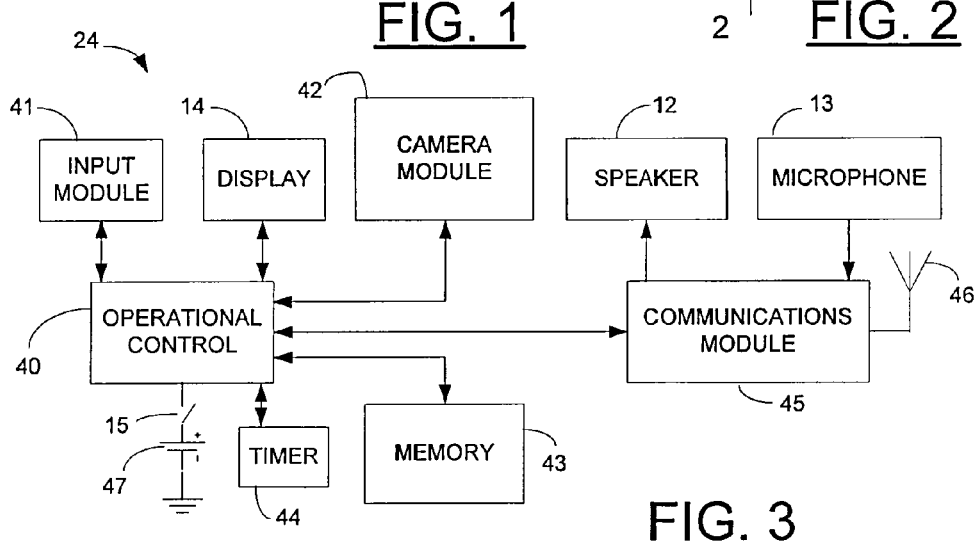
FIG. 3

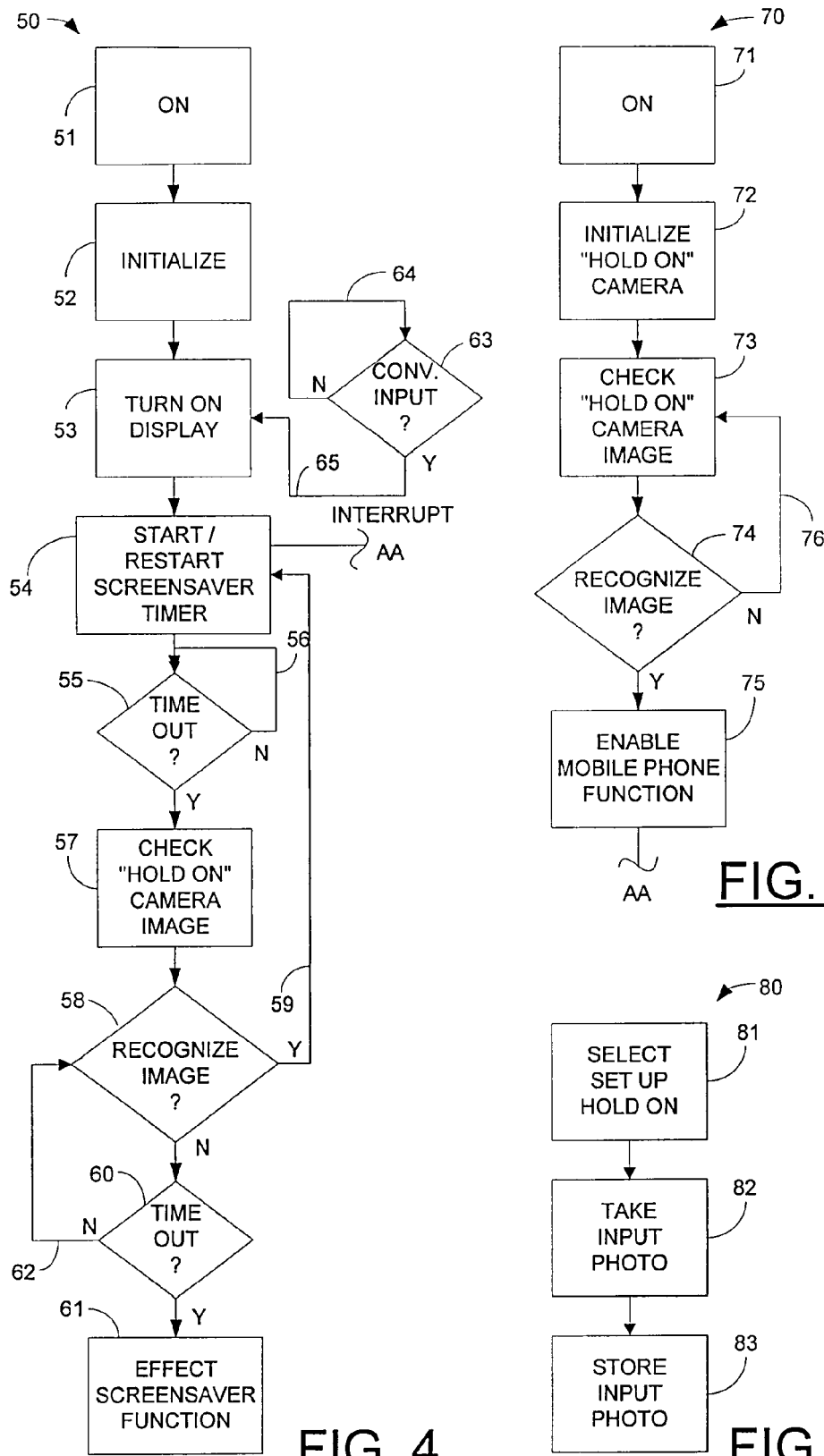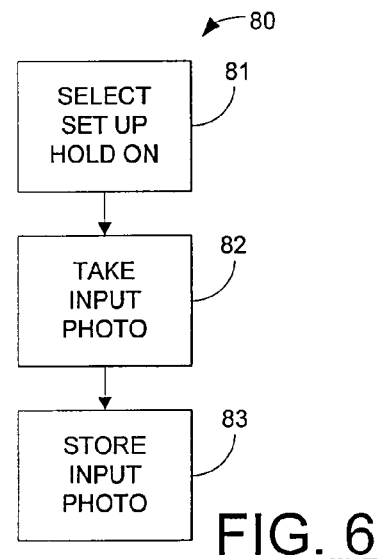

PORTABLE ELECTRONIC EQUIPMENT WITH AUTOMATIC CONTROL TO KEEP DISPLAY TURNED ON AND METHOD

RELATED APPLICATION DATA

This application is a continuation application of U.S. application Ser. No. 11/861,462 filed on Sep. 26, 2007, the disclosure of which is herein incorporated by reference in its entirety.

TECHNICAL FIELD

The present invention relates generally, as indicated, to portable electronic equipment with automatic control to keep display turned on (held in an on mode) and method, and, more particularly, to apparatus and method to hold a display turned on in response to an image.

BACKGROUND

Many portable electronic devices, such as, for example, mobile phones, hand-held computers, personal digital assistants (PDAs), etc., have displays (sometimes referred to as screens or display screens) on which various images, information, text, icons, etc., may be shown. Many of such devices also have a screensaver (also referred to as a screensaver function) that activates after a period of time to turn off or to blank the display of the device or to present a standard image such as the name of the device manufacturer or of the wireless carrier or a standard GUI (graphical user interface), etc. Screensavers are useful for a number of reasons, e.g., to conserve power, to avoid showing information that might be seen by an unauthorized person, etc. For example, a screensaver may turn off the display if the user of the device does not provide within a specified period of time a conventional input to the device, e.g., by manually or otherwise pressing a key, operating a cursor, such as a navigation/function selection key (referred to below as a navigation key for brevity), pointer, trackball or touch pad, or touching a stylus or a finger to a touch sensitive display screen, etc.

Sometimes a screensaver may activate at an inconvenient moment or time. For example, a screensaver may activate to blank a display while a user is looking at the image on the display, e.g., while reading a lengthy text or document shown on the display or while studying a map, picture or other image shown on the display. The user would have to reactivate the display or to stop the effect of the screensaver by providing a conventional input to the device; and having to do this once or sometimes several times may be an inconvenience.

SUMMARY

According to an aspect of the present invention, portable electronic equipment, includes a camera, a display, and circuitry adapted to effect at least one of turning on or holding on the display in response to recognizing a specified image provided by the camera.

Another aspect relates to the circuitry including face recognition software adapted to recognize characteristics of a human face as the specified image.

Another aspect relates to the circuitry being adapted to effect a power saving mode for the display in the absence of a human face being seen by the camera.

Another aspect relates to at least one of the display or circuitry having a screensaver function for the display, and the circuitry being adapted to override the screensaver function at least while a human face is recognized as the specified image.

Another aspect relates to the screensaver function effects a power saving mode for the display after expiration of a period of time that no input has been provided the equipment, and circuitry prevents expiration of the time period at least while the specified image is recognized.

Another aspect relates to the circuitry being adapted to prevent such expiration of the time period for a duration after the specified image has been recognized.

Another aspect relates to the camera being located in the equipment to face in a direction to view the face of a user of the equipment while the user is viewing the display.

Another aspect relates to a fish eye lens for the camera to obtain a wide angle view to facilitate receiving an image of the face of a user of the equipment.

Another aspect relates to the fish eye lens having a focal length to provide to the camera a relatively focused image of the face of a user while such user holds the equipment in a hand during use of the equipment.

Another aspect relates to the equipment comprising a mobile phone, and the camera comprising a standard camera of the mobile phone.

Another aspect relates to including a second camera for taking photographs by the equipment.

Another aspect relates to the circuitry including program code adapted to recognize a prescribed image from the camera and adapted to control operation of a power saving feature associated with the display in response to whether or not the prescribed image is recognized.

Another aspect relates to the circuitry including operational control circuitry for operating the portable electronic equipment and a memory adapted to store information and to provide for retrieval of information and program code for use in connection with operation of the portable electronic equipment, and further including an input module to provide user inputs to the operational control circuitry.

Another aspect relates to the portable electronic equipment being a mobile phone, and further including a communications module adapted to wirelessly transmit and receive signals, a speaker, and a microphone.

Another aspect relates to a method of operating portable electronic equipment, including detecting whether a specified image is received by a camera of the equipment, and operating the equipment in response to whether or not the specified image is received.

Another aspect relates to the detecting including detecting whether the image of a human face is received.

Another aspect relates to the operating including controlling operation of a display of the equipment.

Another aspect relates to the controlling including determining operation of a power saving feature of the display.

Another aspect relates to the portable electronic equipment being a mobile phone, the detecting including detecting whether the image of a face is received by a camera of the mobile phone, and the operating including effecting control or overriding of a screensaver for a display of the mobile phone.

Another aspect relates to a computer program product stored in a storage medium, including a storage medium and a computer program including face recognition software to recognize whether an input image represents that of a human face, and a control program to control operation of portable electronic equipment depending on whether or not an input image represents a human face.

Another aspect relates to keeping the display of portable electronic equipment, e.g., a mobile phone, PDA or the like, turned on while a user is reading or watching the display of the equipment and to activate power saving facilities of the equipment only when a user no longer is reading or watching the display.

Another aspect relates to not activating power saving facilities of a display while there is a human face in front of the device that includes the display, e.g., a person reading or watching the display.

Another aspect relates to automatically turning on a display when a face comes within detection range and/or view of the display or a camera associated with the display.

Another aspect relates to automatically turning on a display when a face is detected as being seen by a camera associated with the display so that a user would not have to press a button or otherwise provide an input to a device including the display to turn on the display.

According to another aspect, a mobile phone automatically turns off or on a screensaver for the display of the mobile phone depending on whether or not there is a face in front of the display.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

BRIEF DESCRIPTION OF THE DRAWINGS

In the annexed drawings:

FIG. 1 is a schematic illustration of the front of a portable communication device, e.g., in the form of a mobile phone;

FIG. 2 is a schematic side elevation view of the mobile phone looking in the direction of the arrows 2-2 of FIG. 1;

FIG. 3 is a schematic block system diagram of circuitry of the portable telephone for carrying out operation thereof in a manner described below;

FIG. 4 is a schematic flow chart illustrating exemplary logic according to which the invention may operate using a hold on function to prevent the screensaver function from turning off the display of the mobile phone;

FIG. 5 is a schematic flow chart illustrating exemplary logic according to which the invention may operate using an image to enable the mobile phone or one or more functions of the mobile phone;

FIG. 6 is a schematic flow chart illustrating setting up of the hold on function of the mobile phone.

DESCRIPTION

Figure 7:
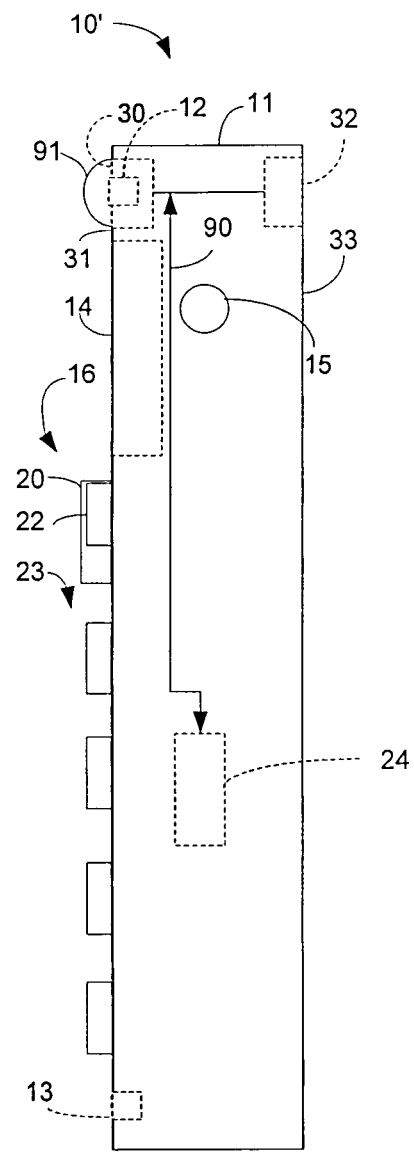
FIG. 7 is a schematic side elevation view similar to FIG. 2 of an alternate embodiment of mobile phone using a single camera for the hold on function and for photographing function.

As used herein, the term "portable communication device" includes portable radio communication equipment. Portable communication device and mobile communication device may be used synonymously. The term "portable radio communication equipment," which may be referred to below as a portable phone (or as portable telephone, mobile phone or mobile telephone), a portable device, a portable radio terminal or a portable terminal, includes all electronic equipment, including, but not limited to, mobile telephones, pagers, communicators, i.e., electronic organizers, smartphones, personal digital assistants (PDAs), or the like. While the present invention is being discussed with respect to portable communication devices, it is to be appreciated that the invention is not intended to be limited to portable communication devices, and can be applied to any type of electronic equipment capable of being used for voice and/or data communication.

As will be appreciated, the invention may be used with portable telephones, other telephones, personal digital assistants (PDA), computers, other communication devices, etc.; for brevity, the invention will be described by way of example with respect to portable telephones, but it will be appreciated that the invention may be used with other communication devices.

Referring in detail to the drawings, and initially to FIGS. 1 and 2, a portable communication device in accordance with an embodiment of the present invention is illustrated generally at 10. The portable communication device 10 will be referred to below as a mobile phone. However, as was mentioned above, reference to "mobile phone" includes various other devices, such as, for example, those mentioned above. In outward appearance, for example, as is illustrated in FIG. 1, the mobile phone is of one type of design or style; however, the features of the invention, as are described in further detail below, may be used in other types of mobile phones, such as those that include cases that open and close (sometimes referred to as a "flip phone"), and various other mobile phones that currently exist or may come into existence in the future.

The mobile phone 10 includes case (housing) 11, speaker 12, microphone 13, display 14, e.g., liquid crystal display, light emitting diode display, or other display, on/off switch 15, and a number of keys generally indicated at 16. The keys 16 may include a number of keys having different respective functions. For example, the key 20 may be a navigation key, selection key or some other type of key; the keys 21, 22 may be, for example, soft switches or soft keys; and the keys 23 may be dialing keys. As an example, the navigation key may be used to scroll through lists shown on the display 14, to select one or more items shown in a list on the display 14, etc. The soft switches 21, 22 may be manually operated to carry out respective functions, such as those shown or listed on the display 14 in proximity to the respective soft switch or selected by the navigation key 20, etc. The dialing keys 23 may be used to dial a telephone number or to input alphanumeric or other data. The speaker 12, microphone 13, display 14, and keys 16 may be used and function in the usual ways in which a mobile phone typically is used, e.g. to initiate, to receive and/or to answer telephone calls, to send and to receive text messages, to connect with and carry out various functions via a network, such as the Internet or some other network, to beam information between mobile phones, etc. These are examples; there may be other uses that currently exist or may exist in the future. The mobile phone 10 also includes operating circuitry 24 that responds to programming and to inputs, e.g., provided by a user pressing a key or applying a stylus or finger to a touch-sensitive screen, etc. or provided from an external source, such as an incoming telephone call or text message, to carry out functions of the mobile phone. One of those functions may be a screensaver function, e.g., as was described above.

The mobile phone 10 includes a "hold on" feature that holds, keeps or maintains, etc. the display 14 in an on mode, e.g., turned on, powered on, etc., to continue displaying an image even after a time period that the screensaver function ordinarily would activate and, for example, turn off the display 14. The hold on feature may be carried out based on an image, for example, an image that is received by the mobile phone 10, e.g., by a camera 30. For example, the image may be that of the face of the user of the mobile phone. The camera 30 in cooperation with circuitry may sense that the user is looking at the display 14; and based on that image, the hold on feature would activate to hold the display on, e.g., to keep the screensaver from turning off the display. Therefore, while the user continues to look at the display and the image of the user is picked up by the camera 30, the hold on feature keeps the display on to continue to show information, etc., to the user without the user having to provide a conventional input to the mobile phone 10 to keep the display turned on.

In an embodiment the hold on feature may instead or additionally be a turn on feature to turn on the display 14 of the mobile phone in response to the mentioned image being picked up, e.g., received, sensed, etc., by the camera 30. Such feature also may be used to turn on the mobile phone, to answer an incoming telephone call, to initiate a telephone call, to receive or to send a text message, etc.

The camera 30 is arranged in the mobile phone 10 to receive or to obtain an image from a direction toward which the front 31 of the mobile phone is facing. For example, while holding the mobile phone in his/her hand, a user typically would look at the display 14 and/or at the keys 16 that are at the front 31 of the mobile phone to see an image on the display, to dial a telephone number, to select an icon shown on the display, to input text for a text message, etc. The camera 30 is arranged to pick up, to receive, to see, to view, etc., the user while the user is looking at the front 31 of the mobile phone.

Sometimes a user may look at the display 14, e.g., to read text, to view a picture, etc., for a relatively long time. The image of the viewer is received by the camera 30 while the user is looking at the display, and circuitry and associated programming may respond to the camera response to the image, e.g., the camera output, to prevent the screensaver function from removing what is being shown on the display. When the image of the viewer no longer is received by the camera the hold on feature may stop preventing the screensaver function from operating in its usual manner, either immediately or after a delay time, such as, for example, the typical delay time of the screensaver or some other delay time that allows the camera to reacquire the image of the user.

The camera 30 may be the same type of camera typically used in a mobile phone or it may be another type of camera. The field of view and focusing characteristics of the camera 30 may be selected to receive a suitable image of a user, e.g., of the user's face, of suitable quality and focus so that the circuitry is able to discern that a user is looking at the mobile phone display 14, for example, while the mobile phone is held in the user's hand at a typical range of distances from the user's face and eyes (for viewing the display).

In an embodiment, the mobile phone 10 may include two cameras, e.g., the camera 30 that faces in a front direction from the front 31 of the mobile phone 10, and another camera 32 that faces in a back direction, e.g., from the back 33 of the mobile phone. As an example, the camera 32, display 14, and navigation key 20 may be used in a conventional manner to take a picture, e.g., the view seen by the camera 32 may be shown on the display 14 while the user views that image and as desired selectively presses the navigation key to store the desired picture in memory. In another embodiment the mobile phone 10 may include only one camera and suitable optical elements and/or light paths to provide to the camera views that would be seen by both the mentioned cameras 30, 32. For example, in such embodiment the operating circuitry 24 may respond to a user input to operate in photographing mode, and in such case the optical elements may allow the image received from the back 33 of the camera to be received by the camera. However, if the mobile phone is operated in a different mode, e.g., a mode that is not one intended to take photographs, the optical elements may prevent the image from the back 33 from reaching the camera sensor and instead may provide an image from the front 31 of the mobile phone to impinge on the camera sensor. The optical elements may include one or more of various devices, such as, for example, movable mirrors of the type used in a single lens reflex camera to determine the path to which incoming light is directed, light shutters that open or close respective light paths to the camera, beam combiners (also known as beam splitters), etc. Fiber optics, reflectors, lenses, etc., may be used to direct images from the front 31 or from the back to the camera.

If a user were holding the mobile phone in his or her hand while looking at text shown on the display 14, the camera may view or see the user, e.g., the face of the user. The camera 30 has associated optics and electronics, e.g., lenses, sensors, such as a ccd (charge coupled device) or other light sensitive device, etc., to pick up an image of the user or whatever else is picked up by the camera lens. The camera 30 may be similar to or the same as a typical camera used in conventional mobile phones that have a camera function.

Turning to FIG. 3, a schematic block system diagram of operating circuitry 24 of the mobile phone 10 is illustrated. The illustration is exemplary; other types of circuitry may be employed in addition to or instead of the operating circuitry 24 to carry out the various functions of a mobile phone and the various functions described in detail herein. The operating circuitry includes an operational control 40 that controls the various components of the operating circuitry 24. An input module 41 provides inputs to the operational control 40, such as, for example, inputs from the various keys 16. Inputs also may be provided from the display 14 if it is a touch screen type of display, and inputs also may be provided the input module 41 from other connections to the mobile phone, etc. The display 14 may be a touch screen that provides for inputs to the input module 41 by touching using a finger, a stylus, or some other device, and the result of such touching may be provided as inputs to the operational control 40. The operational control 40 also may operate the display 14 to determine what information, icons, images, etc. is shown on the display 14.

A camera module 42 is coupled to and operates in response to the operational control 40. The camera module 42 also is coupled to the camera 30 and, if used, also to the camera 32. Electrical power is provided by the operational control 40 to the camera 31, and the camera provides to the operational control image data representing the image seen by or impinging on the camera. Program code in the operating circuitry 24, e.g., stored in the memory 43, may control operation of the operational control 40 to assess the image data received from the camera module to determine whether that image data is recognized as representative of a human face. Image recognition computer programs are commercially available and among those are face recognition computer programs. In an embodiment of the invention the parameters associated with or used in connection with a suitable face recognition program need not be tightly constrained so as to recognize a particular face of a particular person. Rather, the parameters may be relatively loose or broad-based so as to allow the face recognition program to recognize virtually any human face without regard to who is the person belonging to the face.

As an example, the operational control 40 may be a microprocessor or some other electrical or electronic device that is responsive to various inputs, e.g., input signals, and provides various outputs, e.g., output signals. The operational control 40 may be internally programmed or manufactured in a way to include internal programming thereof to carry out various functions. However, in many instances an operational control 40 of a mobile phone 10 would have associated therewith the memory 43 in which appropriate programming instructions, computer program, logic, etc., may be provided the operational control 40 to carry out the functions thereof. The memory 43 also may include storage for telephone numbers and other information concerning contacts who may be called, messaged, etc. using the mobile phone 10, storage of photographs and/or other data, as often is the capability of such memory in conventional mobile phones, for example, and the memory may be used for other purposes that may come into existence in the future. The memory 43 may be a read only memory, random access memory (RAM), flash RAM, programmable read only memory, or some other memory device. Also associated with the operational control 40 is a timer 44 that can be used to provide timing signals representing increments of time for synchronizing operation of the operating circuitry 24 with some other device, for clock/calendar control functions, and/or for determining amount of time (duration) for the hold on function and/or for the screensaver function, as is described herein.

The operating circuitry 24 also includes a communications module 45 that receives inputs from microphone 13 and provides outputs to the speaker 12, as are common functions in a mobile phone. An antenna 46 may be coupled to the communications module 45 to transmit and to receive signals representing telephone communications, data communications, messages, etc. The communications module 45 may operate under control of the operational control 40 in the usual manner of a mobile phone. Additionally, the communications module 45 may provide an input to the operational control 40 to indicate that there is an incoming telephone call or text message; and in response thereto, the operational control 40 may operate the display 14 in conventional manner, e.g., to indicate an incoming phone call, to show a text message or photograph, etc.

A power supply 47 provides electrical power to the operating circuitry 24 and/or to other parts of the mobile phone 10 via the on/off switch 15. The power supply may be a conventional battery or some other source of electrical power. Upon closing the on/off switch 15, the power is provided the operating circuitry 24 to carry out the various functions described herein, for example. If desired, closing the switch 15 may lead to temporary operation of the display to display a start-up message or indication, and then a power saving feature, e.g., a screensaver function, may be implemented to turn off the display until a specified image, e.g., one suitably resembling a human face, is seen by the camera 30 and the operational control 40 of the operating circuitry 24 recognizes the specified image. As was mentioned elsewhere herein, the human face need not be of a specific person but rather is more generic. In another embodiment the display may remain off upon closing of the switch 15 until the operational control recognizes the specified image, e.g., a human face.

A computer program flow chart or logic diagram is illustrated at 50 in FIG. 4. Such flow chart 50 represents functions that may be carried out in the operating circuitry 24 in carrying out an embodiment of the invention as an example. The functions illustrated in FIG. 4 and described herein may be provided the operating circuitry as a computer program, for example, that is written in appropriate computer language or logic format to carry out the various steps described. A person having ordinary skill in the art would be able to write such program to carry out the steps and functions illustrated and described here. It will be appreciated that the program code may be stored in a storage medium. For example, as is described further below, the program code may include a computer program including face recognition software to recognize whether an input image represents that of a human face, and a control program to control operation of portable electronic equipment depending on whether or not an input image represents a human face.

Initially the portable electronic equipment, e.g., mobile phone 10, is turned on at block 51, for example, by closing the on-off switch or power switch 15, and the mobile phone, including the operating circuitry 24 is initialized at block 52. Initialization functions are carried out in many types of electronic equipment and will depend on the various functions, capabilities, etc. of the equipment, as is known. At block 53 the display 14 may be turned on by the operating circuitry 24, for example. At block 54 a screensaver timer is started or is restarted; the timer may be the timer 44 in conjunction with the operational control 40; for example, the timer 44 provides timing signals that are counted or otherwise aggregated by the operational control until a prescribed time period has been determined. At block 55 an inquiry is made whether the time period for the screensaver has timed out. A loop is followed at 56 until time out has occurred at timer block 55, for example. Ordinarily in some prior screensaver circuits or displays with screensavers, if the screensaver timer has timed out, the screensaver may provide various modes for the mobile phone display, etc., such as by the power saving feature of the screensaver being put into effect, e.g., by blanking the display, turning off energy to the display or to part of the display, e.g., to the backlight that may be illuminating a liquid crystal display, etc., or by providing a prescribed image on the display, such as the name of the manufacturer of the mobile phone, the mobile phone carrier, etc. or a graphical user interface (GUI) image.

In accordance with the described embodiment of the invention, though, the screensaver feature may be blocked or prevented from entering the power saving mode or some similar mode or having an effect on the display 14, etc. by the hold on feature of the invention. At block 57 the hold on camera image is checked. For example, the operational control 40 may check the camera 30 to determine whether an image is being received and, if so, to load the image data, for example, into the operational control 40 or into memory 43. At block 58 an inquiry is made whether image data received from the camera 30 is recognized as a specified image. For example, does the image look like a face of a human being? For this purpose image recognition software in the operating circuitry may be used, as was mentioned above. If the answer is yes, then a loop 59 is followed back to block 54 to restart the screensaver timer, and the logic subsequently flows back through blocks 55-58 and loop 59 again without turning on the screensaver or power saving feature until the image no longer is recognized as the specified image.

At block 58 if the image received from the camera 30 is not a specified image, e.g., an image of a human face, then the logic would flow via a timer 60 to block 61, to effect or to implement a screensaver function. Effecting or implementing the screensaver function would turn off the display 14 or would reduce power to the display to saver power for the mobile phone or other portable electronic equipment in which the features of the invention are used. The timer 60 represents an inquiry whether the specified image had not been recognized for more than the time set in the timer 60, e.g., in case the user were to turn his or her head briefly away from the camera 30 or has turned the phone away from his or her face, etc., while still holding the mobile phone 10 in his or her hand and desiring still to continue observing the image shown on the display. Thus, if the timer 60 has not yet timed out, loop 62 is followed back to block 58 where inquiry is made to determine whether the image data received from the camera 30 represents a specified image. If it does, then loop 59 is followed; if it does not, then the flow chart flows to timer block 60 again. If the timer 60 has timed out without the image from the camera 30 being recognized at block 58 as a specified image, then at block 61 the power saving feature of the screensaver, etc., is implemented.

It will be appreciated that the description of the above embodiment presents the hold on feature as restarting the screensaver timer. It also may be said that the hold on feature disables, blocks, overrides or prevents operation of the screensaver or other power saver function of the mobile phone 10. Furthermore, in an embodiment of the invention the screensaver or power saver function of the mobile phone may not be quite as distinct from the hold on function; in such case, for example, the hold on function may keep the display 14 turned on as long as there a recognized specified image received by the camera 30 and recognized by the operational control, but when there no longer is such recognized image seen by the camera 30, the hold on function may cause the operational control 40 to turn off the display 14 or to otherwise cause it to go into a power saving mode.

In FIG. 4 at block 63 an inquiry is made to determine whether a conventional input has been received by the input module 41. Such conventional input may be, for example, a user pressing a key 16, touching a touch sensitive display 14, etc., or an external input is received, e.g., an incoming telephone call or text message. At block 63 there may be a constant looking for such a conventional input as loop line 64 is followed unless such conventional input is detected. If such conventional input is detected, then an interrupt type function may be provided via line 65 to the flow chart logic 50 to turn on the display 14 at block 53, and then the logic may follow as was described above. If successive conventional inputs are detected at block 63 before any timing out by the timers 55 and 60, for example, the display will remain turned on.

Another flow chart or logic diagram 70 is shown in FIG. 5. The flow chart 70 represents steps to enable the mobile phone 10 or other portable electronic equipment. At block 71 the mobile phone is turned on, e.g., by the switch 15. At block 72 the hold on camera 30 is initialized to respond to images or scenes provided to or viewed by the camera. At block 73 the hold on camera 30 is checked to read the image data from it. At block 74 an inquiry is made whether the image represented by image data received from the camera 30 is a specified image. In this case if the specified image is set to be relatively loosely defined, e.g., as substantially any human face, then upon recognizing any human face at block 75 the mobile phone 10 is enabled for use. If at block 74 the input image data is not recognized as a specified image, then loop 76 is followed until a specified image is received. It is necessary to receive a specified image before the mobile phone 10 can be enabled at block 75. Furthermore, as is represented by the connection AA between the flow charts 70 of FIGS. 5 and 50 of FIG. 4, if desired after the mobile phone 10 has been enabled at block 75, then the steps from blocks 54-61 of FIG. 4 may be carried out. Alternatively, there may be no connection between the flow charts 50 and 70; and in such case the mobile phone 10 simply may be enabled by the steps in flow chart 70, after which other standard operation of the mobile phone may be carried out.

Briefly referring to FIG. 6, a hold on set up flow chart or logic 80 is illustrated. Such flow chart shows an example of how images may be stored in the operating circuitry 24, e.g., in memory 43 or elsewhere, for comparison to determine whether an image seen by the camera 30 is a specified image. At block 81 the set up function for the hold on feature is selected. This may be a setup function of the mobile phone. At block 82 an input photo is taken using the camera 30, for example. The image may be provided in some other way. At step 83 the image is stored, e.g., in memory 43 so that it would be available when the image comparison or recognition step is carried out at step 58 in flow chart 50 and step 74 in flow chart 70. The steps 81-83 of flow chart 80 may be carried out for several persons (individuals) to obtain average reference data representing faces, e.g., a generic face, for use in effecting the hold on feature, for example.

Briefly referring to FIG. 7, another mobile phone 10' is illustrated. The mobile phone 10' is similar to the mobile phone 10 except that there is one connection 90 between the operating circuitry 24 and both cameras 30, 32. Also, there is a fish eye lens 91 in front of the camera 30 to provide a wider field of view for that camera than ordinarily would be available from a more conventional camera lens. The fish eye lens allows for the face of the user to be at various locations from directly in front of the mobile phone to off to a side, top or bottom of the mobile phone while the image data provided by the camera still may be sufficient to be considered a specified image for the above described functions. The mobile phone 10' may have in the operating circuitry 24 selection functions to allow the user to select whether to use the mobile phone in photographing mode to use the camera 32 to take photographs for storage in memory 43, for example. In such photographic mode it is possible that an image from the hold on camera 30 also may be provided the operating circuitry 24 to assure that the mobile phone display does not time out and/or to assure that the user is an authorized user, as was described above. When the user selects operation of the mobile phone 10' in other than photographing mode, the operating circuitry 24 may turn off the camera 32 to save power.

It will be appreciated that portions of the present invention can be implemented in hardware, software, firmware, or a combination thereof. In the described embodiment(s), a number of the steps or methods may be implemented in software or firmware that is stored in a memory and that is executed by a suitable instruction execution system. If implemented in hardware, for example, as in an alternative embodiment, implementation may be with any or a combination of the following technologies, which are all well known in the art: discrete logic circuit(s) having logic gates for implementing logic functions upon data signals, application specific integrated circuit(s) (ASIC) having appropriate combinational logic gates, programmable gate array(s) (PGA), field programmable gate array(s) (FPGA), etc.

Any process or method descriptions or blocks in flow charts may be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The logic and/or steps represented in the flow diagrams of the drawings, which, for example, may be considered an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The above description and accompanying drawings depict the various features of the invention. It will be appreciated that the appropriate computer code could be prepared by a person who has ordinary skill in the art to carry out the various steps and procedures described above and illustrated in the drawings. It also will be appreciated that the various terminals, computers, servers, networks and the like described above may be virtually any type and that the computer code may be prepared to carry out the invention using such apparatus in accordance with the disclosure hereof.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. Portable electronic equipment, comprising:
a housing,
a display located in a front portion of the housing,
a first camera located in the front portion of the housing facing a first direction for capturing images of a user viewing the display,
a second camera located in a back portion of the housing facing a second direction opposite the first direction, and
circuitry configured to effect turning on the display in response to recognizing an image of a human face provided by the first camera.

2. The equipment of claim 1, said circuitry comprising face recognition software adapted to recognize characteristics of a human face as the specified image, and software stored in a machine readable medium and configured to hold on the display in response to recognizing characteristics of a human face.

3. The equipment of claim 2, the circuitry configured to effect a power saving mode for the display in the absence of a human face being seen by the first camera.

4. The equipment of claim 1, at least one of the display or circuitry having a screensaver function for the display, and the circuitry configured to override the screensaver function at least while a human face is recognized.

5. The equipment of claim 4, wherein the screensaver function effects a power saving mode for the display after expiration of a period of time that no input has been provided the equipment, and the circuitry prevents expiration of the time period at least while an image of a human face is recognized, and the circuitry is configured to prevent such expiration of the time period for a duration after an image of a human face has been recognized.

6. The equipment of claim 1, wherein the first camera is located in the equipment to face in a direction away from the direction that a user of the equipment would view the display, and further comprising at least one of optical elements or a light path to provide to the first camera views looking toward the direction that the user of the equipment would view the display to provide to the first camera a view of the face of the user of the equipment while the user is viewing the display.

7. The equipment of claim 1 further comprising a fish eye lens for the first camera to obtain a wide angle view to facilitate receiving an image of the face of a user of the equipment.

8. The equipment of claim 1, the equipment comprising a mobile phone, and the first camera and the second camera comprising a standard camera of the mobile phone.

9. The equipment of claim 1, wherein the circuitry includes memory and program code stored in the memory and configured to recognize a human face from the first camera and to control operation of a power saving feature associated with the display in response to whether or not an the of a human face is recognized.

10. The equipment of claim 9, wherein the portable electronic equipment is a mobile phone, and further comprising a communications module adapted to wirelessly transmit and receive signals, a speaker, and a microphone.

11. A method of operating portable electronic equipment, comprising
   detecting whether an image of a human face is received by a camera of the equipment, and
   operating the equipment in response to detecting an image of a human face being received, said operating comprising at least one of turning on a display of the equipment, answering an incoming phone call, initiating a phone call, sending a text message or receiving a text message.

12. The method of claim 11, said detecting comprising using a fish eye lens to obtain a wide angle view by the camera.

13. The method of claim 11, said operating comprising controlling operation of a display of the equipment by holding on the display in response to receiving an image of a human face by the camera.

14. The method of claim 11, wherein the portable electronic equipment is a mobile phone having a display and a screen saver function for the display, said detecting comprising detecting whether an image of a human face is received by a camera of the mobile phone, and said operating comprising effecting control or overriding of a screensaver function for the display of the mobile phone.

15. A non-transitory machine readable storage medium storing a computer program product, comprising
   a computer program including face recognition software to recognize whether an input image represents that of a human face, and
   a control program to control operation of portable electronic equipment depending on whether or not an input image represents a human face,
   said control program, when executed, configured at least one of to turn on a display of the portable electronic equipment and to hold on the display, to answer an incoming phone call received by the portable electronic equipment, to initiate a phone call by the portable electronic equipment, to send a text message by the portable electronic equipment or to receive a text message by the portable electronic equipment.

16. The equipment of claim 1, said circuitry configured to at least one of answer an incoming phone call, initiate a phone call, send a text message or receive a text message in response to recognizing an image of a human face.

* * * * *